No. 780,020. PATENTED JAN. 17, 1905.
C. D. BRENT.
FASTENER FOR SHOES OR THE LIKE.
APPLICATION FILED MAY 7, 1903.
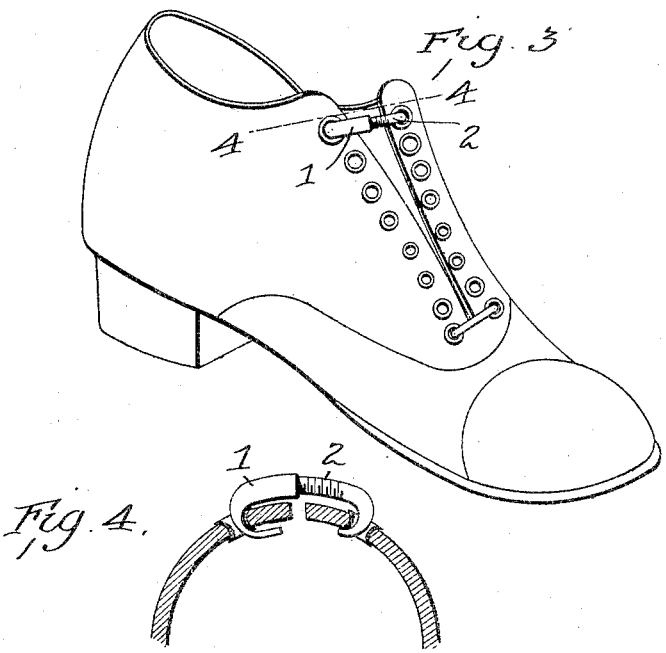
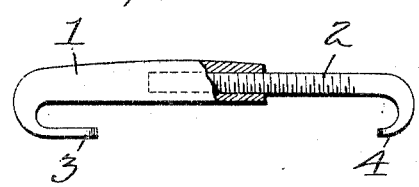

No. 780,020. Patented January 17, 1905.

UNITED STATES PATENT OFFICE.

CHARLES DANIEL BRENT, OF CROMWELL, NEW ZEALAND.

FASTENER FOR SHOES OR THE LIKE.

SPECIFICATION forming part of Letters Patent No. 780,020, dated January 17, 1905.

Application filed May 7, 1903. Serial No. 156,105.

*To all whom it may concern:*

Be it known that I, CHARLES DANIEL BRENT, dredgeman, of Cromwell, Otago, New Zealand, have invented a certain new and useful Fastener for Shoes or the Like, of which the following is a specification.

This invention relates mainly to fasteners for shoes and other articles of wearing-apparel. Its object is to provide a simple and inexpensive fastener which will do away with laces and the like and which will fasten the edges of shoes and the like, such as are made at present with holes on each side of the edge of the parts to be fastened together, and which may also be easily operated both in fastening and unfastening.

It consists of the features, combination, and arrangement of parts hereinafter described, and more particularly pointed out in the claim.

In the accompanying drawings, Figure 1 is a side view of the fastener. Fig. 2 is a plan view of same. Fig. 3 is a perspective view of a shoe with the fastener thereon. Fig. 4 is a section on the line 4 4 of Fig. 3.

In the drawings the same numbers refer to the same or similar parts.

The invention consists of two portions 1 and 2, each portion being provided at one end with a hook. The portion 1 has a long hook 3, and this portion is hollowed and internally threaded, so as to receive the externally-threaded portion 2, provided with the smaller hook. The end of the hook 3 is narrow, and it will be seen that after it is placed in the eye the device may be lengthened or shortened by unscrewing or screwing in, respectively, the threaded portion 2 to suit, as desired, any distance between two opposite eyes. The hook 3 may be pressed tightly toward the body portion after it is inserted in the eye of the shoe. One of these fasteners is placed in each pair of eyes as in the manner shown in Figs. 3 and 4.

Having now particularly described and ascertained the nature of my said invention and in what manner the same is to be performed, I declare that what I claim is—

A fastener consisting of two hooked portions one portion internally threaded and the other portion externally threaded and adapted to be screwed into the first-mentioned portion substantially as described.

In witness whereof I have hereunto set my hand in presence of two witnesses.

CHARLES DANIEL BRENT.

Witnesses:
 A. J. PARK,
 J. R. PARK.